(12) United States Patent
Shaheen et al.

(10) Patent No.: US 7,805,139 B2
(45) Date of Patent: Sep. 28, 2010

(54) WIRELESS COMMUNICATION SYSTEM THAT SUPPORTS MULTIPLE STANDARDS, MULTIPLE PROTOCOL REVISIONS, MULTIPLE EXTENDED SERVICES AND MULTIPLE EXTENDED SERVICES DELIVERY OPTIONS AND METHOD OF OPERATION THEREFOR

(75) Inventors: Kamel M. Shaheen, Plano, TX (US); Girish Patel, Plano, TX (US); Chenhong Huang, Plano, TX (US); Mark R. O'Brien, Carrollton, TX (US)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 12/501,450

(22) Filed: Jul. 12, 2009

(65) Prior Publication Data

US 2009/0275330 A1    Nov. 5, 2009

Related U.S. Application Data

(60) Division of application No. 10/963,478, filed on Oct. 12, 2004, now Pat. No. 7,580,707, which is a continuation of application No. 09/629,786, filed on Jul. 31, 2000, now abandoned, which is a continuation of application No. 09/002,064, filed on Dec. 31, 1997, now Pat. No. 6,169,893, which is a continuation-in-part of application No. 08/938,227, filed on Sep. 26, 1997, now abandoned.

(60) Provisional application No. 60/042,614, filed on Apr. 4, 1997.

(51) Int. Cl.
*H04W 48/20* (2009.01)

(52) U.S. Cl. .................. 455/434; 455/432.1; 455/432.2
(58) Field of Classification Search .............. 455/426.1, 455/560, 432.1, 403, 550, 414.1, 422.1, 424, 455/434, 556.1, 557, 432.2, 185.1
See application file for complete search history.

(56) References Cited

U.S. PATENT DOCUMENTS 5,924,026 A * 7/1999 Krishnan ................. 455/414.1
5,963,869 A * 10/1999 Fehnel ........................ 455/511
6,104,924 A * 8/2000 Shirai ......................... 455/418

* cited by examiner

*Primary Examiner*—CongVan Tran
(74) *Attorney, Agent, or Firm*—Garlick Harrison & Markison; Bruce E. Garlick; Kevin L. Smith

(57) ABSTRACT

A wireless communication system facilitates communication with subscribing units within a respective service area that supports at least one communication protocol revision. The system communicates with a subscribing unit operating within a respective service area to determine the communication protocol revisions supported by the subscribing unit. Subsequently, the subscribing unit and base station communicate according to a supported communication protocol revision. The base station and subscribing unit further communicate to indicate extended services supported by the subscribing unit and the methods of delivering the extended services to the subscribing unit. The extended services include caller line ID, message waiting indications and short message services among other extended services. In addition to a base station, the wireless communication system may include a mobile switching center that is in communication with the base station. The mobile switching center includes a visitor location register that records communication protocol revisions of the subscribing unit.

15 Claims, 11 Drawing Sheets

WIRELESS COMMUNICATION SYSTEM THAT SUPPORTS MULTIPLE STANDARDS, MULTIPLE PROTOCOL REVISIONS, MULTIPLE EXTENDED SERVICES AND MULTIPLE EXTENDED SERVICES DELIVERY OPTIONS AND METHOD OF OPERATION THEREFOR

CROSS-REFERENCES TO RELATED APPLICATIONS

The present application is a divisional of U.S. Utility Ser. No. 10/963,478, filed Oct. 12, 2004, now issued as U.S. Pat. No. 7,580,707, which is a continuation of U.S. Utility Ser. No. 09/629,786, filed Jul. 31, 2000, now abandoned, which is a continuation of U.S. Utility Ser. No. 09/002,064, filed Dec. 13, 1997, now issued as U.S. Pat. No. 6,169,893, which is a continuation-in-part of U.S. application Ser. No. 08/938,227, filed Sep. 26, 1997, now abandoned, which claims priority under 35 U.S.C. Sec. 119(e) to U.S. Provisional Application Ser. No. 60/042,614, filed Apr. 4, 1997, all of which are hereby incorporated herein by reference in its entirety.

BACKGROUND

1. Technical Field

This invention relates generally to the delivery of vertical features that have been recently incorporated into North American analog and digital cellular/PCS standards. More specifically, the invention provides a method and apparatus for wireless communication systems to query mobile stations operating in analog mode as the need arises for the detailed capability information required to efficiently and reliably deliver these vertical features to those mobile stations. Also, the invention provides an additional method and apparatus for wireless communication systems to control the solicitation of the capability information using the overhead information. The ability to query mobile stations for capability information circumvents the need to configure, maintain, and transport this information around the network infrastructure as a mobile station roams between mobile serving areas.

2. Related Art

Wireless communication systems are well known in the art. In a typical wireless communication system, several base stations connected via a mobile switching center provide wireless communication infrastructure within a service area. Such combination of stationary base stations and the mobile switching center is often referred to as the "network." Within the service area, each of the base stations provides wireless communication capability within a respective cell. Each cell may be further subdivided into one or more sectors. The base stations communicate with subscribing units operating within respective cells. The subscribing units may be hand held units, car mounted units or other units capable of communicating with the base stations. The mobile switching center routes communications between the base stations and the public switched telephone network and other mobile switching centers supporting other respective service areas. Thus, users of the subscribing units operating within the service area may communicate with users connected to the public switched telephone network as well as users of other subscribing units.

Wireless communication systems generally support standard operating protocols that specify the communication between subscriber units and base stations. Standard operating protocols include the Advanced Mobile Phone Service (AMPS) standards, the Narrowband Advanced Mobile Phone Service (NAMPS) standards, the Global Standard for Mobility (GSM), the Code Division Multiple Access (CDMA) standard and Time Division Multiple Access (TDMA) standards, among others. These standards are typically not compatible with one another. While some base stations and some subscribing units may support more than one standard operating protocol, at any given moment in time, a base station and a subscribing unit must communicate using the same protocol.

Further, variations exist within the operating protocols. The AMPS standard, for example, includes a number of differing standards, such as the IS-3, TIA/EIA 553, IS-88, IS-91, TIA/EIA 553-A, and IS-95 standards. In addition, a single standard may have different protocol revisions, such as the IS-95A and IS-95B protocol revisions. Thus, complexities arise even when the base station and subscribing units operate according to the same standard but under differing protocol revisions. While the base station may support more than one protocol revision, the base station cannot always determine which protocol revisions the analog subscribing unit supports.

Recently, several vertical features have been incorporated into the North American analog cellular standards and the analog sections of dual mode cellular standards, for example the TIA/EIA 553-A and IS-91-A analog standards and the IS-95-A dual mode standard. Calling Line Identification (CLI), Message Waiting Notification (MWN), Short Message Services (SMS), and Priority Access and Channel Assignment (PACA) are among the vertical features recently incorporated into the standards cited.

The standards allow some vertical features to be implemented at the option of mobile station manufacturers. To further complicate matters, a second layer of options is also allowed. Although a mobile station manufacturer may choose to support an optional vertical feature, the standards often do not require the mobile to support all possible mechanisms for delivering that vertical feature to the mobile station. For example, SMS is an optional vertical feature in the IS-91-A standard. However, there are two mechanisms provided for delivering SMS to a mobile station operating in accordance with the IS-91-A standard: the Extended Protocol (EP) SMS message and the Alert With Info SMS message. If a mobile manufacturer chooses to support the IS-91-A SMS feature, it has the option of supporting the EP SMS message, the Alert With Info SMS message, or both messages. The same is true for the IS-91-A CLI and MWN features. The standard allows the CLI feature to be delivered using either the EP CLI message or the Alert With Info/Flash With Info messages. The MWN feature may be delivered using the EP Voice Mail message or the Message Waiting Order.

The variety of these vertical features and the variety of their delivery mechanisms have created implementation difficulties for analog operations of wireless mobile communication systems. To operate efficiently and reliably when one of these vertical features is to be delivered to a mobile station, the system is required to know, unambiguously, whether the mobile supports that vertical feature and the mechanism(s) by which the mobile accepts delivery of that feature. One technique to address this problem is to require the cellular service provider to record (e.g., datafill) detailed mobile station capability information in the subscriber's profile. This information would then be propagated throughout the cellular network wherever the subscriber roams to and obtains service. North American standards bodies have resisted the burden that this technique would place upon the cellular network and have declined to include such a capability in the relevant networking standards such as IS-41. Furthermore, cellular service providers prefer to maintain service level information (such as whether a customer has subscribed for SMS rather than the specific option(s) of the air-interface protocol that each mobile manufacturer has chosen to support delivery of that service. It is clear that the industry expects the analog communication system serving the subscriber to ascertain, as needed, the vertical features and delivery mechanisms supported by the mobile station.

Historically, the 2-bit Mobile Protocol Capability Indicator (MPCI) field that a mobile station reports to an analog communication system when it registers with the system or originates a call was sufficient for the analog communication system to determine how to provide service to the mobile station. A mobile station sets the MPCI to '00' to report as an analog mobile (any one of IS-3, TIA/EIA-553, IS-88, IS-91, TIA-EIA-553-A, and IS-91-A), sets the MPCI to '01' to report as an IS-54-B mobile (TDMA dual mode), sets the MPCI to '10' to report as any IS-95 mobile (CDMA dual mode), and sets the MPCI to '11' to report as any IS-136 mobile (TDMA Digital Control Channel dual mode). As such, the MPCI is inadequate to distinguish between analog mobile standards and standard revisions, much less standard optionality nuances.

When the more modern North American digital standards were being developed (i.e. IS136, IS95) the standards bodies recognized the limitation of the MPCI and incorporated extensive facilities in the digital standards to: 1) communicate the capability of the digital communication system to the digital mobile stations; and 2) to request the mobile station for a detailed list of capabilities. Analog communication systems may serve analog mobile stations or dual-mode digital/analog mobile stations operating in analog mode. Unfortunately, the ability for analog mobile communication systems to discern capability information beyond MPCI has not kept pace with the proliferation of standards, standard revisions, and vertical feature optionality.

Thus, there is a need in the art for a wireless communication system that provides support for subscribing units operating in its service area, each of which may support differing standards, protocol revisions and extended services. Such a system must efficiently utilize available bandwidth within the service area to maximize capacity and minimize traffic.

SUMMARY OF THE INVENTION

The present invention achieves technical advantages as an analog or a dual mode digital communication system that queries/solicits analog and dual-mode analog/digital mobile stations operating in analog mode concerning their capabilities, as needed. Hereafter, the term "mobile station" applies both to analog mobile stations, dual-mode analog/digital mobile stations and any other multi-mode or multi-band mobile station that may seek or be assigned analog service. The level to which mobile station capabilities are discerned is sufficient to efficiently and reliably provide any analog service supported by the standard to which the mobile station complies.

In accordance with the present invention, the analog communication system may query a mobile station to report its capabilities when the mobile station is camping on an analog control channel (ACCH) or when the analog communication system has achieved closed-loop communication with the mobile station on an analog voice channel (AVCH). Also, the analog communication system may solicit all mobile stations to report their capabilities when camping on an ACCH. The service provider implementing this invention shall be able to control the reverse link ACCH traffic by preventing home mobile stations or roaming mobile stations from accessing the system to report their protocol revisions and service capabilities and rely only on the query mechanism. This control mechanism may be accomplished by setting the PCI Home flag and the PCI Roam flag to '0'. Also, the service provider may instruct only roaming mobile stations to register their protocol revisions and service capabilities by setting the PCI Roaming flag to '1'. When a mobile station implementing the present invention is in a state conducive to receive and process the protocol capability query order of the present invention, the mobile station responsively transmits a protocol capability report to the analog communication system.

Should a mobile station implementing the present invention be camping on an ACCH when it receives the protocol capability query order, it attempts to transmit its protocol capability report using the same process as for the transmission of a page response. That process requires the mobile station to enter the Await Message state following the transmission of its response. For a time equal to that required for a page response in accordance with the standard to which the mobile station complies, the mobile station remains in the Await Message state until timer expiration or until one of the following orders or messages is received from the analog communication system addressed to the mobile station:

Release—process the same as required by the relevant standard when a Release order is received in the Await Message state following transmission of a page response.

MWN Order—the present invention introduces this order as one that is eligible to be received in the Await Message state following the transmission of a protocol capability report in response to a protocol capability query order. The mobile station processes a MWN order in the normal fashion.

Any EP message—the present invention introduces EP messages as those that are eligible to be received in the Await Message state following the transmission of a protocol capability report in response to a protocol capability query order. The mobile station processes the EP message in the normal manner.

The protocol capability query order is not a substitute for a page order. The page order must still be utilized by the analog communication system for call set up. However, the protocol capability query order can be used to facilitate a vertical feature "locate then deliver" strategy that substantially increases the successful delivery of the vertical feature once the mobile station serving ACCH has been identified. In accordance with the present invention, the mobile station is prohibited from immediately departing the ACCH upon which it transmits its protocol capability report. This provides a window of opportunity for the analog communication system to deliver the vertical feature to the mobile station on that ACCH.

A mobile station assigned to an AVCH and implementing the present invention is capable of receiving the protocol capability query order and transmitting its protocol capability report in any of the following states:

Waiting For Order—the mobile station confirms the order with the protocol capability report message. The mobile station remains in the Waiting for Order Task.

Waiting For Answer—the mobile station confirms the order with the protocol capability report message. The mobile station remains in the Waiting for Answer Task.

Conversation—the mobile station confirms the order with the protocol capability report message. The mobile station remains in the Conversation Task.

An analog communication system may be required to query a mobile station for its protocol capability on an AVCH because the first time the analog communication system needs protocol capability information is when the mobile station is on an AVCH. In the case of an Inter-MSC handoff, a mobile station may be presented to an MSC for the first time when it is already on an AVCH. In that case, the MSC has not had an opportunity to query the mobile station for its protocol capability on an ACCH.

Moreover, other aspects of the present invention will become apparent with further reference to the drawings and specification which follow.

DETAILED DESCRIPTION OF THE DRAWINGS

Figure 1:
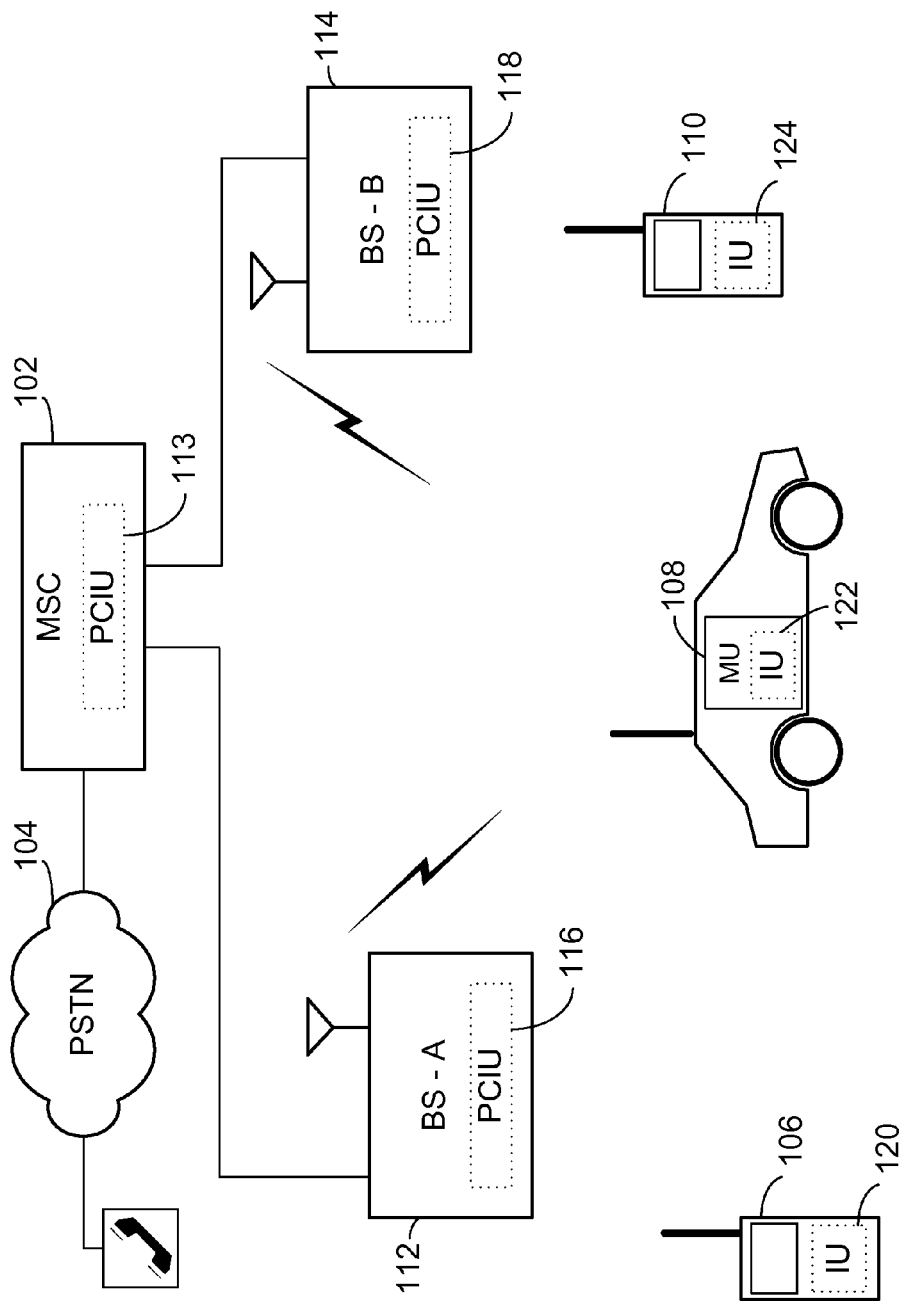
FIG. 1 is a block diagram illustrating a wireless communication system constructed according to the present invention having protocol capability indication support and extended services support.

FIG. 1 illustrates a wireless communication system 100 constructed according to the present invention that provides support for multiple protocols, multiple protocol revisions, multiple extended services and multiple extended services delivery options. The wireless communication system includes a mobile switching center (MSC) 102, base stations 112 and 114 and wireless subscribing units 106, 108, and 110 operating within a service area corresponding to the base stations 112 and 114. The base stations 112 and 114 may support operation according to analog standards such as AMPS, digital standards such as TDMA and CDMA and according to both analog and digital standards.

The base stations 112 and 114 connect to the MSC 102. The MSC 102 connects to the public switched telephone network (PSTN) 104 and routes calls between the base stations 112 and 114 and between the base stations 112 and 114 and the PSTN 104. Each of the wireless subscribing units 106, 108, and 110 includes a wireless interface that facilitates the wireless communication with the base stations 112 and 114. Such wireless interfaces, which typically include radio circuitry and processing circuitry are known and will not be described further herein except as to expand upon the teachings of the present invention. Thus, in combination, the components of the wireless communication system allow users of the subscribing units 106, 108 and 110 to communicate with one another and with users connected to the PSTN 104.

Each of the subscribing units 106, 108 and 110 operates according to one or more of the standards supported by the base stations 112 and 114. For example, subscribing unit 106 may operate according to the AMPS standard while subscribing unit 108 may operate according to the TDMA standard and subscribing unit 110 may operate according to the CDMA standard. However, as is evident, communication between any of the subscribing units 106, 108 or 110 and one of the base stations 112 or 114 must be accomplished via a protocol supported by the respective base station and subscribing unit.

The MSC 102 and each base station 112 and 114 each include a protocol capability indication unit (PCIU) 113, 116 and 118. The PCIUs 113, 116 and 118 coordinate operation of the MSC 102, the base stations 112 and 114 and the subscribing units 106, 108 and 110 with respect to specific protocols and protocol revisions. Further, the PCIUs 113, 116 and 118 coordinate operation with respect to extended services and the delivery of extended services. Each of the subscribing units 106, 108 and 110 includes an indication unit (IU) 120, 122 and 124, respectively, which indicates to one or more of the PCIUs 113, 116 and 118 respective capabilities of the subscribing units 106, 108 and 110. Thus, the PCIUs 113, 116 and 118 work in cooperation with the IUs 120, 122 and 124 to coordinate operation within the wireless communication system 100 with respect to supported protocols, protocol revisions, extended services and extended service delivery.

In an installation wherein the base stations 112 and 114 support only analog communications, the PCIUs 116 and 118 determine which analog standards, if any, are supported by each of the subscribing units 106, 108, and 110. A determination of support is accomplished via interaction with the IUs 120, 122 and 124. In making a determination, one or more of the PCIUs 113, 116 and 118 may broadcast queries that are received by the IUs 120, 122 and 124 via respective subscribing units. The IUs 120, 122 and 124 may then respond via the subscribing units 106, 108 and 110 to indicate to the PCIUs 116, 118 and 113 the particular capabilities of respective subscribing units. Based the information exchanged, the PCIUs 113, 116 and 118 direct the subscribing units to communicate in particular fashions with the base stations 112 and 114. Operation in the particular fashion continues until changes are made.

While the PCIUs 113, 116 and 118 are shown resident in the MSC 102 and base stations 112 and 114, respectively, they functionality provided by the PCIUs need not be resident in each location. For example, a single PCIU 113 in the MSC 102 may facilitate operation according to the present invention. Alternatively, PCIUs 116 and 118 residing within the base stations 112 and 114 could also, by themselves, accomplish the desired operation. Thus, in general, operations required must merely be accomplished by the "network" (the base stations 112 and 114 and the MSC 102 in combination) in coordination with the subscribing units 106, 108 and 110.

Operation of the PCIUs 113, 116, and 118 according to the present invention may be accomplished by particular hardware components within the network or by general hardware components programmed to operate according to the present invention. Likewise, operations accomplished by the IUs 120, 122 and 124 of the subscribing units 106, 108 and 110, respectively, may be accomplished by specialized hardware or by generalized hardware specifically programmed to perform such operations.

In a particular example of operation of the wireless communication system 100, subscribing unit 106 operates according to the AMPS standard, protocol revision IS-91 and supports no extended services. In response to a broadcast request or query request on an analog control channel, the IU 120 of the subscribing unit 106 responds to the PCIU 116, indicating its supported operating protocol, protocol revision and that it supports no extended services. The PCIU 116 coordinates further operation with PCIU 113 causing base stations 112 and 114 to communicate with subscribing unit 106 in such supported AMPS standard according to protocol revision IS-91. Further, PCIU 113 prevents the delivery of extended services to subscribing unit 106 even if the subscribing unit 106 would otherwise receive such extended services.

In another operation of the wireless communication system 100, subscribing unit 110 operates according to both the AMPS standard and the CDMA standard. In such case, subscribing unit 110 may communicate with the base station 102 according to either standard but may prefer operation under the CDMA standard. Further, the subscribing unit 110 may support a particular protocol revision for each standard. Moreover, the subscribing unit 110 may receive extended services when operating according to the CDMA standard via standard delivery protocols but cannot support extended services under the AMPS standard.

When the subscribing unit 110 first contacts base station 114, it responds to an analog beacon signal on a control channel. The base station 114 and the subscribing unit then establish dialog wherein the IU 124 in the subscribing unit indicates to the PCIU 118 in the base station 114 that the subscribing unit 110 supports a certain protocol revision of the CDMA standard. The IU 124 also indicates to the PCIU 118 that the subscribing unit 110 supports extended services when operating according to the CDMA standard and its supported delivery mechanism. The PCIU 118, in conjunction with the PCIU 113 in the MSC 102 then determines how subsequent communications will occur. Should the base station 114 support the CDMA standard, the PCIU 118 and PCIU 113 will then direct the IU 124 of the subscribing unit 114 to operate according to the CDMA standard. In subsequent communications with the subscribing unit 110, the base station 114 (and also base station 112) operates according to the supported protocol revision of CDMA standard and provides extended services to the subscribing unit 114 as indicated.

Figure 2:
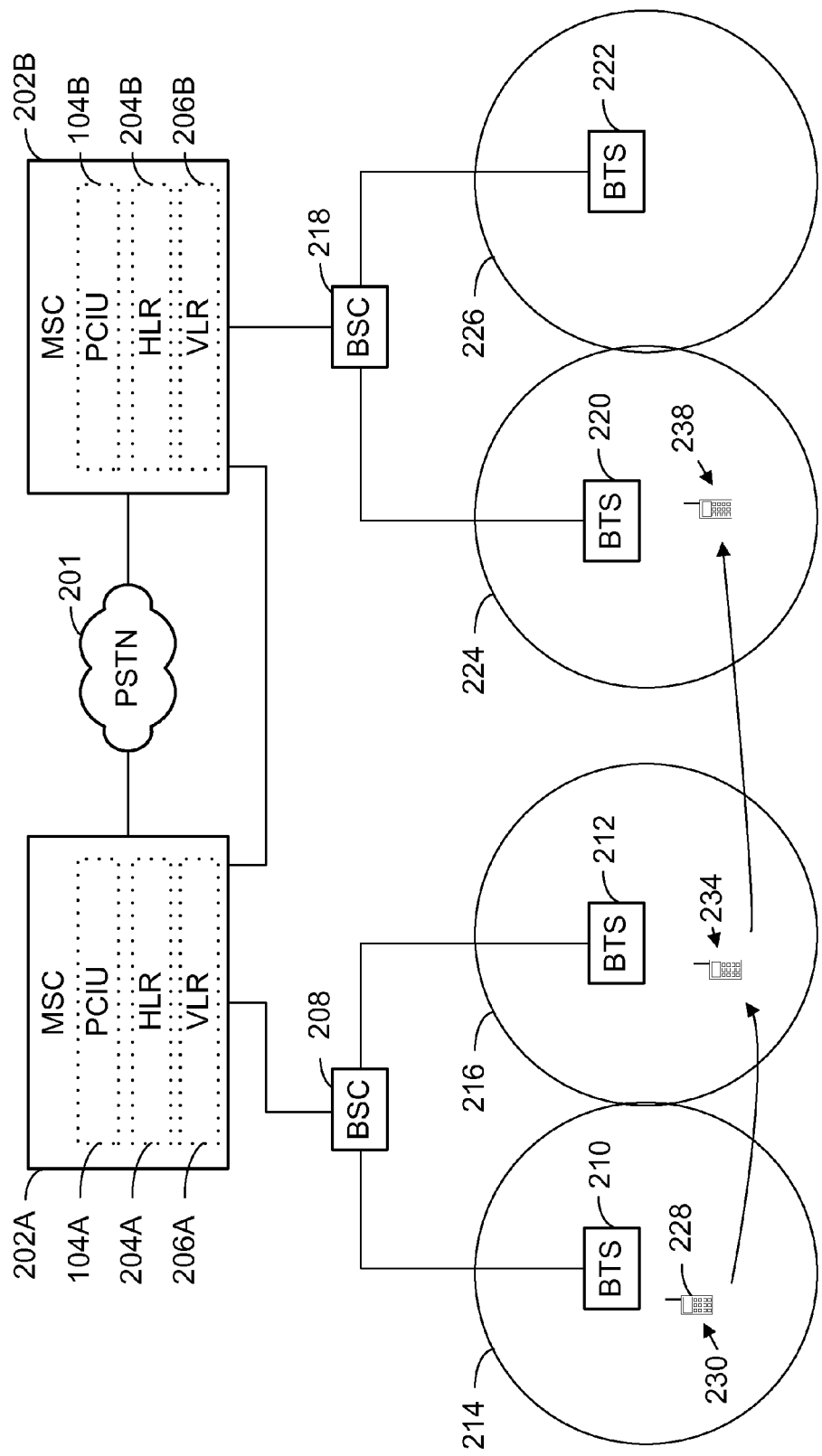
FIG. 2 is a block diagram illustrating in more detail a wireless communication system constructed according to the present invention and detailing operation during movement of a subscribing unit within the system.

FIG. 2 illustrates an alternative wireless communication system 200 constructed according to the present invention. As shown, the wireless communication system 200 includes mobile switching centers 202A and 202B interconnected either directly or via the PSTN 201. Each of these mobile switching centers 202A and 202B supports additional components that provide respective wireless communication coverage. For example, MSC 202A provides service to base station controller (BSC) 208 which connects to base transceiver stations 210 and 212. As is further shown, MSC 202B supports BSC 218 which in turn supports base transceiver stations (BTSs) 220 and 222. In a typical installation, the MSCs 202A and 202B would also support further connections to other BSCs (not shown). Each of the BTSs provides wireless communication within a respective cell. For example, BTS 210 provides coverage within cell 214, BTS 212 provides coverage within cell 216, BTS 220 provides coverage within cell 224, and BTS 222 provides coverage within cell 226. These cells 214, 216, 224 and 226 are shown adjacent one another for illustrative purposes only. In a typical wireless communication system, BTSs would be spaced to provide complete coverage within a service area.

Each of the MSCs 202A and 202B includes a home location register (HLR) and a visitor location register (VLR). For example, MSC 202A includes HLR 204A and VLR 206A while MSC 202B includes HLR 204B and VLR 206B. Each of the HLRs 204A and 204B includes subscriber information for those subscribing units that have their home location respective to the particular MSC 202A or 202B, as the case may be. Upon activation of a subscribing unit within an area served by the wireless communication system 200, subscription information is moved from one of the HLRs 204A or 204B into one of the VLRs 206A or 206B, depending upon the cell within which the subscribing unit becomes active.

For example, assume that a subscribing unit 228 becomes active at position 230 within cell 214 served by MSC 202A. However, MSC 202B is the subscribing unit's 228 home MSC. Thus, upon such activation, subscriber information is retrieved from HLR 204B and loaded into VLR 206A. MSC 202A then uses the retrieved subscriber information to provide service for the subscribing unit 228 within those cells served by the MSC 202A. These operations are generally known in the art and not previously described herein except as to expand upon the teachings of the present invention.

During its operation within the service area provided by the wireless communication system 200, the subscribing unit 228 moves from and to various positions within the service area. As discussed, at position 230 the subscribing unit 228 is initially activated. Then, the subscribing unit 228 listens for a broadcast signal from BTS 210 which requests that the subscribing unit 228 provide a communication protocol capability indication and optionally, an indication of the extended services it supports and supported delivery protocols. When the subscribing unit 228 receives the broadcast signal, the subscribing unit 228 responds, indicating its protocol capabilities, its protocol capability revisions, those extended services it supports and its supported extended services delivery mechanisms.

Alternatively, the subscribing unit 228 may be queried to respond with such information. Upon such a query request, it provides the information. Typically, the broadcast signal and response is on a control channel. However, the query request and response could be either on the control channel or a voice channel, depending upon whether ongoing communication exists. The PCIU 104A, in cooperation with an IU in the subscribing unit, then determines how subsequent communications will be performed in supported locations. After the determination is made, the pertinent information is stored in the VLR 206A for reference during further operations.

When subscribing unit 228 moves from location 230 to location 234, it has moved from cell 214 supported by BTS 210 to cell 216 which is supported by BTS 212. Since cell 216 is also served by MSC 202A, no additional steps must be taken. Such is the case because information relating to subscribing unit 228 resides within VLR 206A and operation under the same protocol and protocol revision may continue. However, should the BTS 212 not support the current set of operating parameters determined, the PCIU 104A will then coordinate with the subscribing unit 228 different operating parameters. The BTS 212 will then communicate with the subscribing unit 228 according to these different operating parameters.

Subsequently, when subscribing unit 228 moves from position 234 within cell 216 to position 238 within cell 224, the subscribing unit has moved from the service area of MSC 202A to the service area of MSC 202B. Thus, when the subscribing unit moves to cell 224, subscriber information may be downloaded from HLR 204B to VLR 206B depending upon the particular operation of the system 200. Further, information relating to the protocol and extended service capabilities of the subscribing unit 228 must also be obtained. While the information could, under some circumstances, be transferred from VLR 206A to VLR 206B, since the information in VLR 206A was determined based upon the protocols and protocol revisions supported by MSC 202A and related components, it may be useless for subsequent operation under MSC 202B. Thus, the PCIU 104B typically will obtain current information from the subscribing unit 228.

Should the subscribing unit 228 have ongoing communication with BTS 220 while subscribing unit 228 moves from position 234 to position 238, the PCIU 104B may obtain the information via the voice channel by sharing the voice channel with the ongoing communication. Alternatively, the PCIU 104B could synthesize such information by those techniques previously described for the control channel. Once the information is synthesized, the VLR 206B is updated and subsequent communications under the MSC 202B are performed according to the information.

Figure 3:
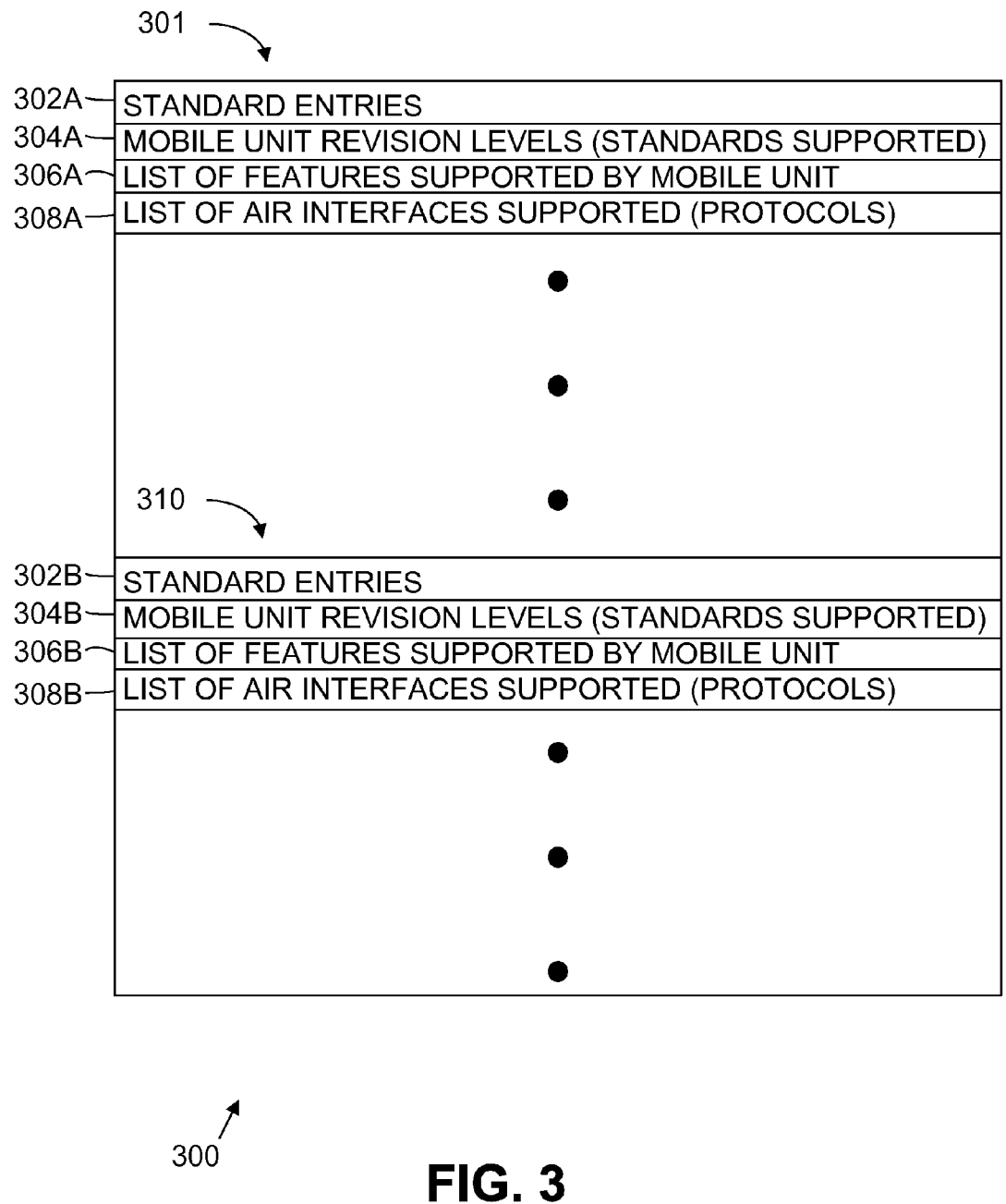
FIG. 3 is a diagram illustrating structure of records stored within a location register of a mobile switching center constructed according to the present invention.

FIG. 3 illustrates the structure of records contained within VLR 204A or VLR 204B of MSCs 202A and 202B according to the present invention. VLR records 300 includes standard entries relating to subscription information for particular subscribing units as well as entries relating to the operation of a wireless communication system constructed according to the present invention. While entries 301 and 310 are shown, with each corresponding to a different subscribing unit, the VLR records 300 will contain entries for every subscribing unit operating within the area served by the respective MSC.

As was previously described, when a subscribing unit initially becomes active within a service area served by an MSC, subscription information from the subscribing unit's home location register are loaded into the VLR. Such standard entries 302A are retrieved from the HLR of the respective subscribing unit. However, the subscribing unit's revision levels (standards supported) 304A, the list of extended features supported by the subscribing unit 306A, and the air interface protocols supported by the subscribing unit 308A are determined by the PCIU via communication with the subscribing unit IU.

Subscribing unit revision levels 304A and 304B indicate the particular communications standard(s) supported by the subscribing unit. Mobile revision levels under the AMPS standards could include, for example, IS-3, 553, IS-88, IS-91, 553-A, and IS-91-A. The lists of features supported 306A and 306B indicates those extended services supported by the respective subscribing unit, for example, calling line ID, message waiting notification, and short message services. The lists of features supported also indicate the manner in which the extended services are delivered to the subscribing unit. Finally, the lists of air interfaces supported 308A and 308B indicate the protocols supported by the subscribing units. The air interfaces supported 308A and 308B may indicate the protocol or protocols that support such features for the respective subscribing units.

Figure 4:
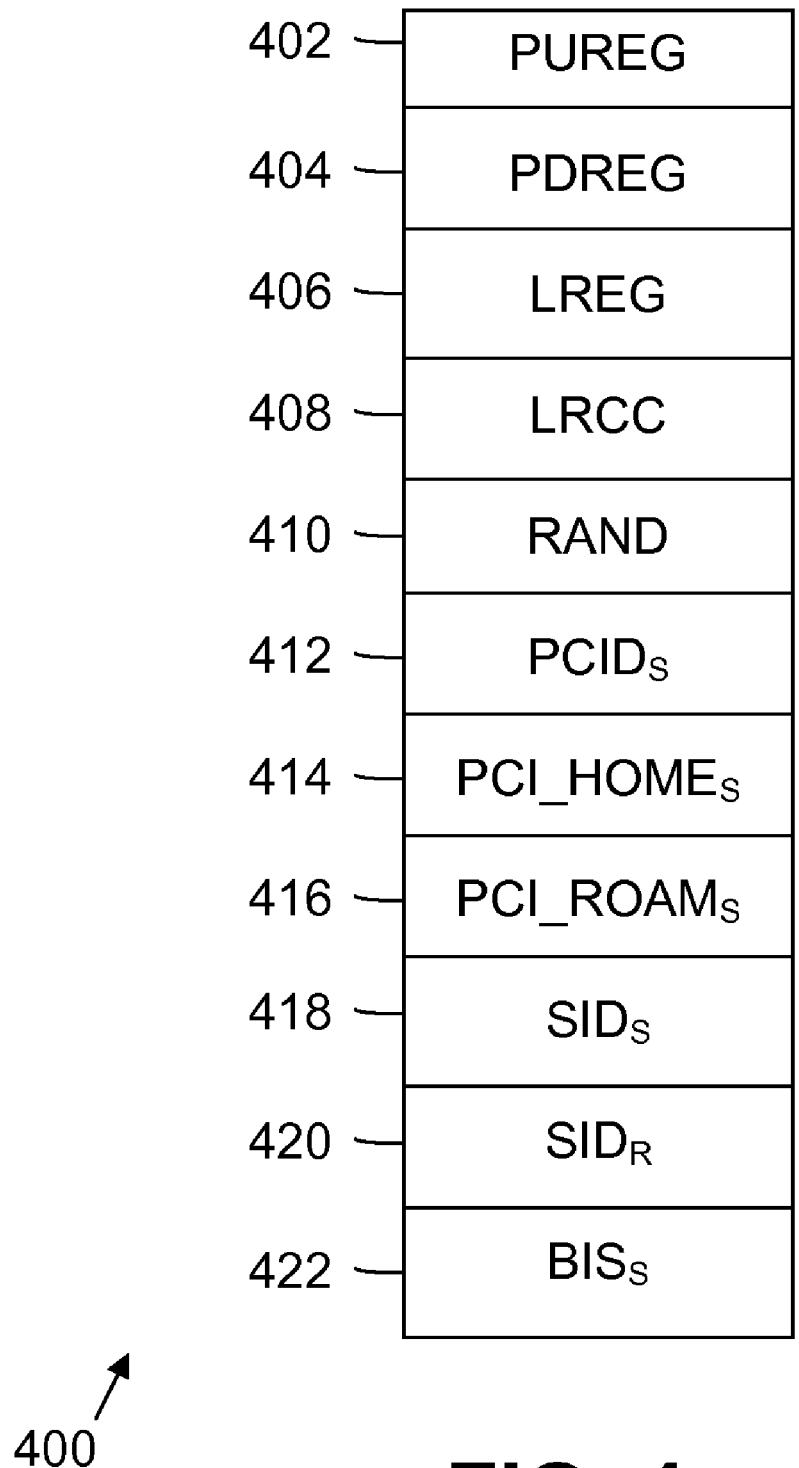
FIG. 4 is a block diagram illustrating partial register contents of a subscribing unit constructed according to the present invention.

FIG. 4 illustrates various registers provided within a subscribing unit constructed according to the present invention. Registers PUREG 402, PDREG 404, LREG 406, LRCC 408, and RAND 410 are registers employed during normal operation of the subscribing unit. Register PUREG 402 represents a power up registration. Register PDREG 404 represents the power down registration. The register LREG 406 represents location area registration.

Register $PCID_S$ 412 is the protocol capability identification register and is set at zero at the power-up. Register PCI_$HOME_S$ 414 represents the protocol capability indicator flag for the HOME mobile station. Register PCI_ROAM$_S$ 416 is the protocol capability indicator for roaming. Register $SID_S$ 418 is the system ID of the serving system (Serving System ID). Register $SID_R$ 420 is the system ID of the receiving system, the received system ID. Finally, register $BIS_S$ 422 is the busy-idle status bit register.

Figure 5:
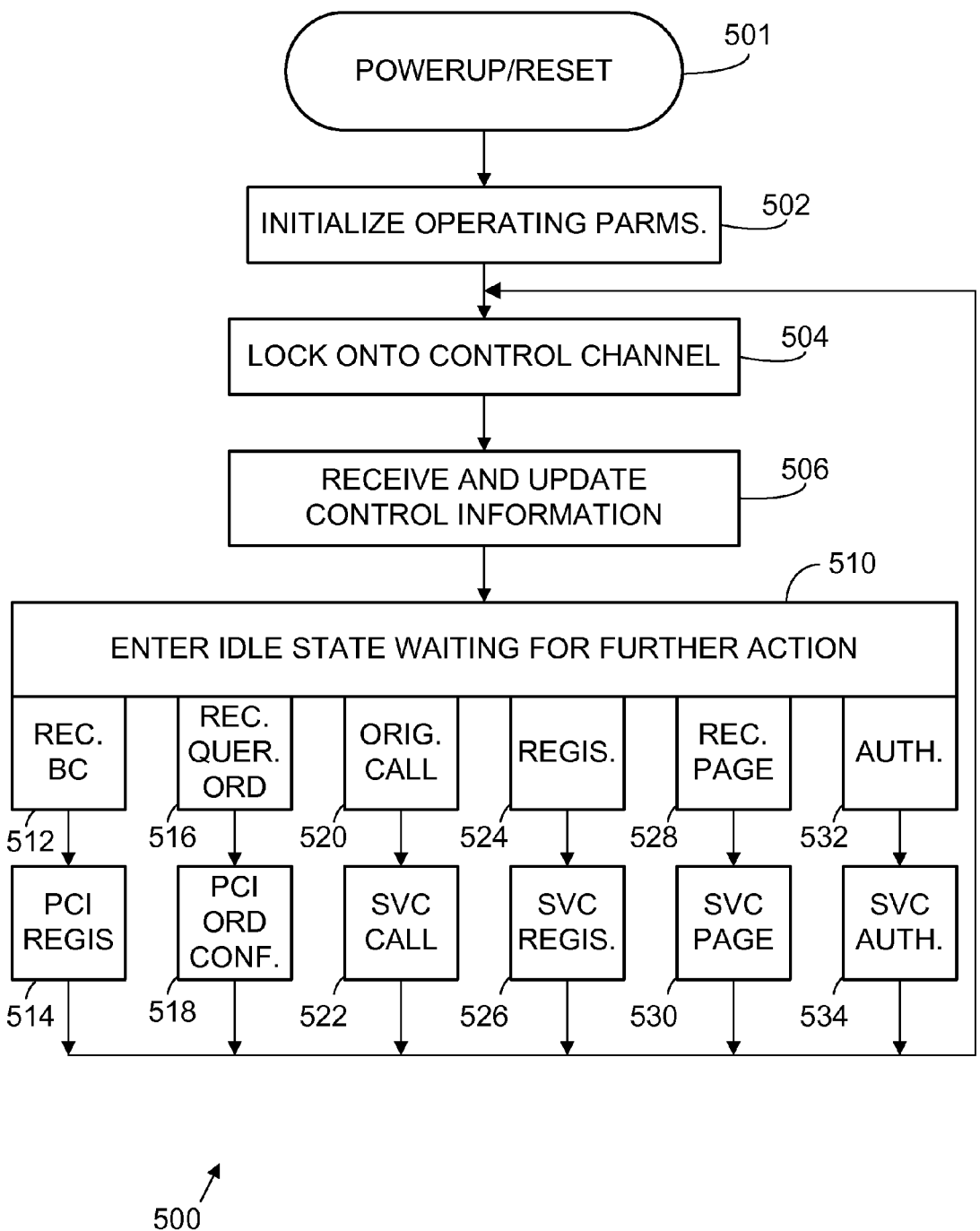
FIG. 5 is a logic diagram illustrating an overview of operation of a wireless communication system constructed according to the present invention.

FIG. 5 illustrates a generalized flow diagram for the operation of a wireless communication system according to the present invention. Operation commences at step 501 wherein the subscribing unit powers up (or resets) within a cell served by the wireless communication system. An example of such operation is illustrated with respect to subscribing unit 228 operating at position 230 within cell 214 illustrated in FIG. 2. After such power up at step 501, operation proceeds to step 502 wherein the subscribing unit initializes the parameters, i.e. the contents of the registers previously described with respect to FIG. 4. In such case, the subscribing unit sets the contents of each register described in FIG. 4 to the logical value zero. Thus, each of the registers PUREG 402, PDREG 404, LREG 406, LRCC 408, RAND 410, $PCID_S$ 412, PCI_$HOME_S$ 414, PCI_ROAM$_S$ 416, $SID_S$ 418, $SID_R$ 420 and $BIS_S$ 422 are set to a logical zero value at step 502. From step 502 operation proceeds to step 504 wherein the subscribing unit locks onto a control channel. As is known, control channels are channels provided that allow the base stations (BTS, BSC, and MSC in combination) to establish communication with subscribing units operating within respective service areas.

Once such control channel has been locked onto at step 504, operation proceeds to step 506 wherein the subscribing unit receives and updates its control information. During receiving and updating the control information, the subscribing unit may determine that it is not in the same system (SID) in which it previously operated and updates its internal parameters accordingly. From step 506, operation proceeds to step 510 wherein the subscribing unit listens to the control channel while entering and awaiting instructions from the network. In such idle state at step 510, the subscribing unit may enter various operations.

Standard operations include originating a call at step 520, registering at step 524, receiving a page at step 528 and authenticating at step 532. Upon originating a call at step 520, operation relating to such origination would be serviced at step 522. Upon completion of step 522 operation would proceed to step 504. Upon entering a registration operation, the registration is serviced at step 526 and operation also proceeds then to step 504. A paging operation at step 528 may include receiving a page or responding to a page. After such operation at step 528, the page request and response is serviced at step 530. From step 530, operation proceeds again to step 504. Upon initiation of authentication at step 532, operation proceeds to step 534 wherein the authentication is serviced. From step 534 operation proceeds to step 504.

According to the present invention, the subscribing unit may receive a broadcast receipt at step 512. Such broadcast receipt may cause the subscribing unit to initiate a PCI registration at step 514. The operation of step 514 will be discussed in more detail subsequently. Once the PCI registration is complete at step 514, operation returns to step 504. At step 516, the subscribing unit may receive a PCI query order. Upon receiving a PCI query order at step 516, the subscribing unit executes a PCI order confirmation at step 518. Such PCI order confirmation causes the subscribing unit to provide standard and feature information to the base station that will cause the VLR record corresponding to the subscribing unit to be updated. Such is also the case with the information provided in the PCI registration response at step 514. From both steps 514 and 518 operation proceeds again to step 504.

Figure 6A:
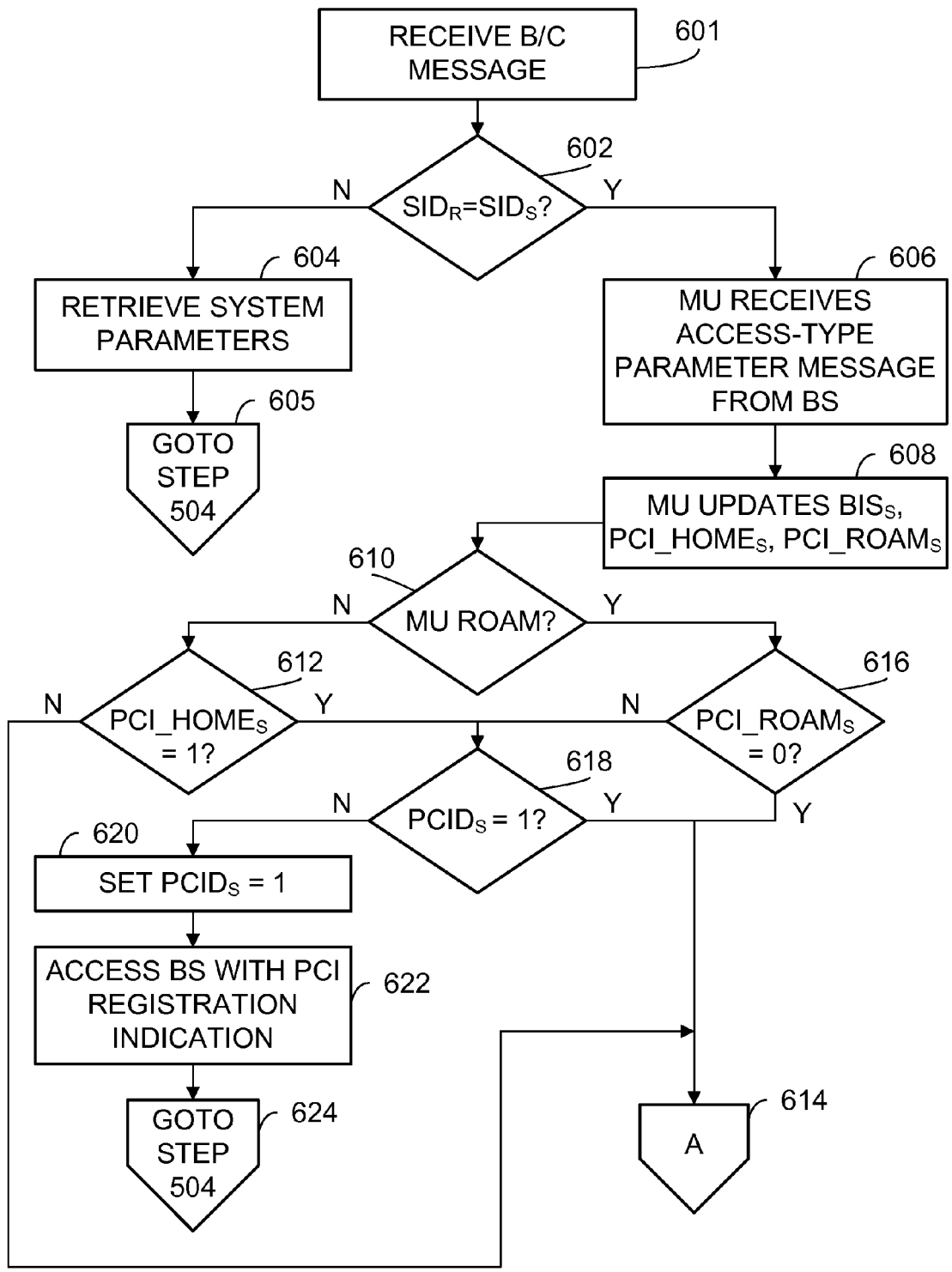
FIG. 6A through 6C are logic diagrams illustrating operation of a wireless communication system constructed according to the present invention in responding to an overhead broadcast information request.
Figure 6B:
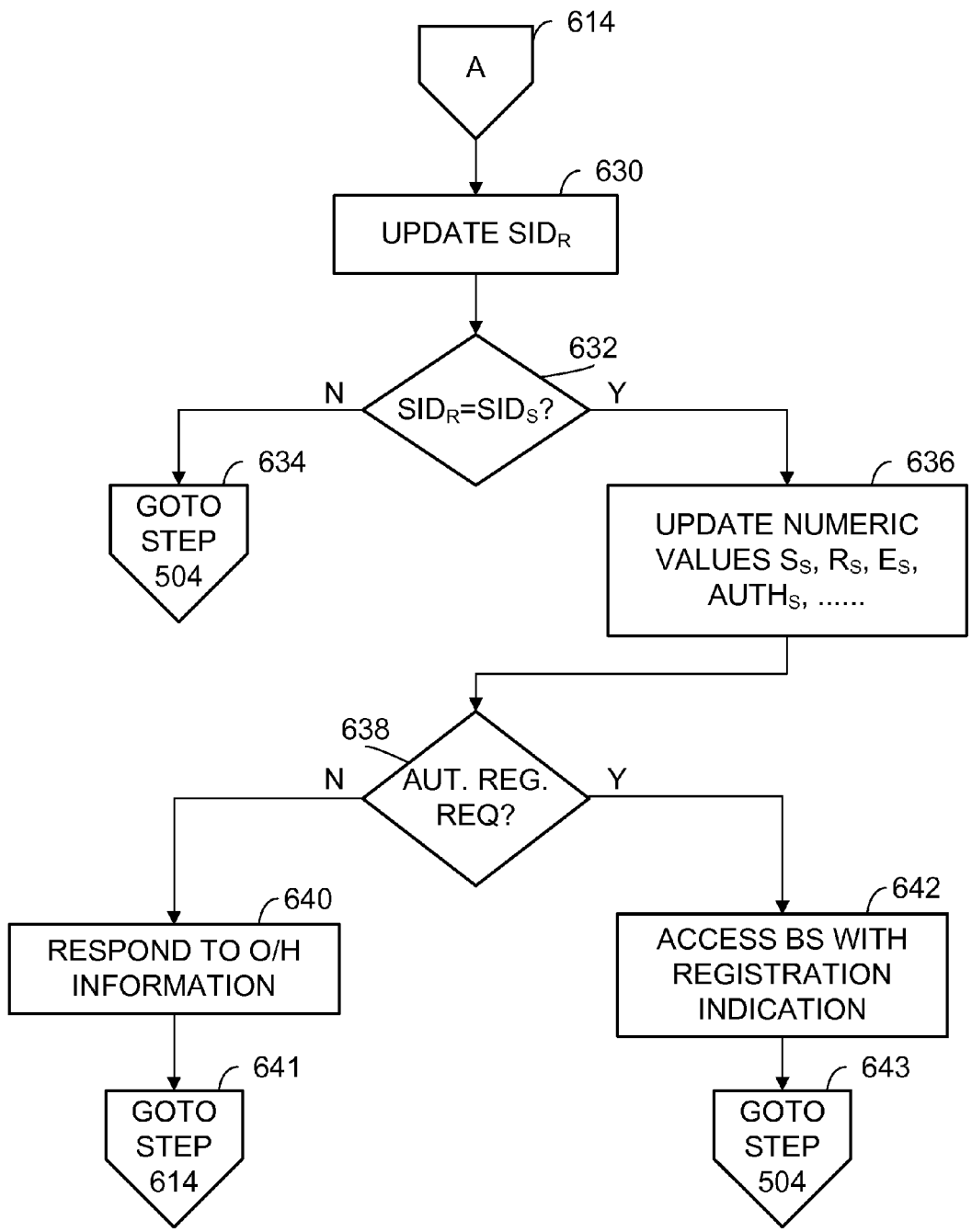
Figure 6C:
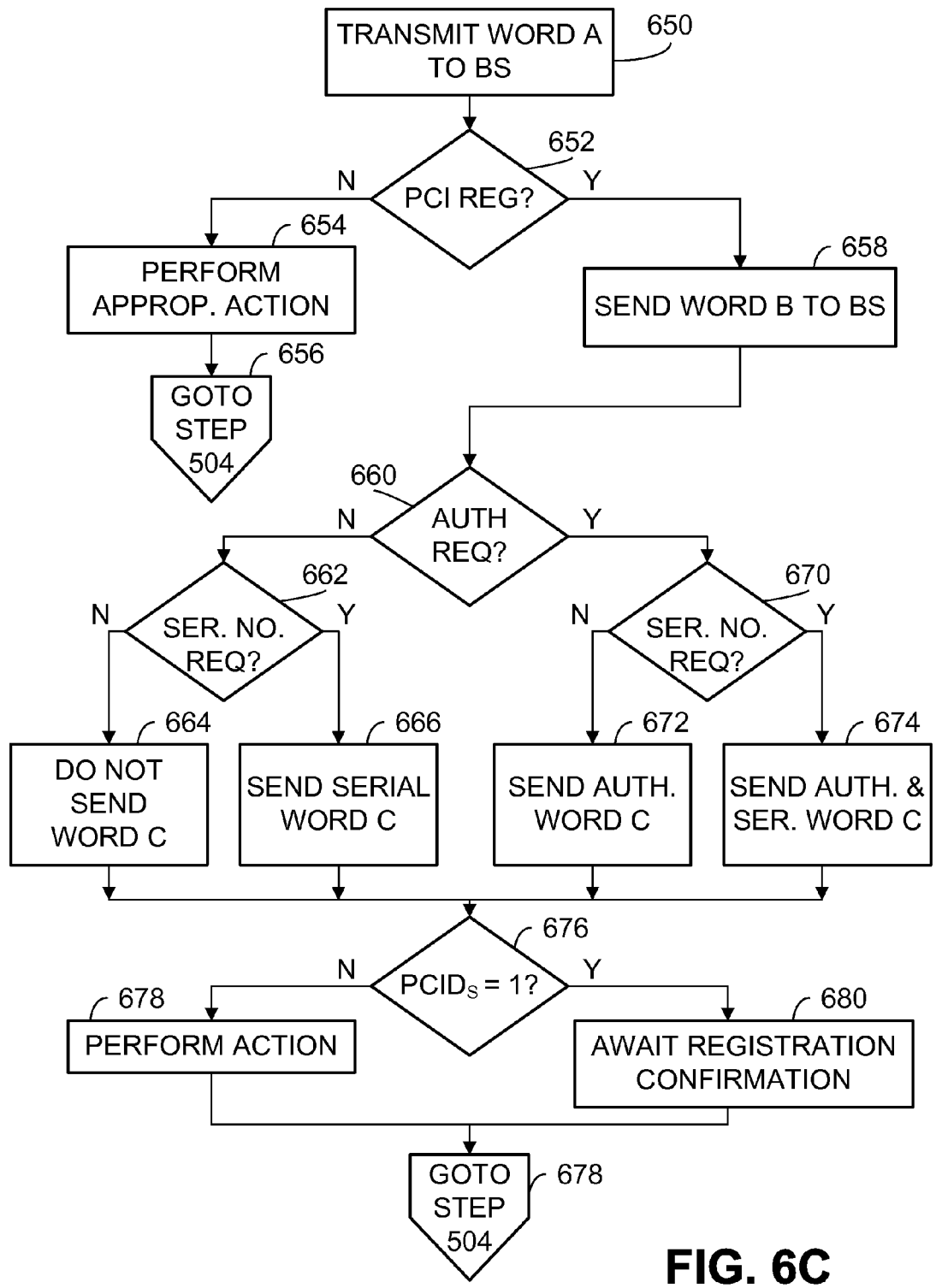

FIGS. 6A, 6B, and 6C illustrate operation of the wireless communication system according to the present invention in responding to a broadcast receipt. Such steps were previously described in general at steps 512 and 514 of FIG. 5. Upon receipt of a broadcast at step 601, the subscribing unit proceeds to step 602 wherein it determines whether register contents $SID_R$ are equal to register contents $SID_S$. The parameter $SID_R$ was previously received at step 512 and represents the identification of the current system providing wireless communication to the subscribing unit. Thus, with parameter $SID_S$ representing the previous system ID, the subscribing unit determines whether this particular broadcast reception has been previously responded to. If the answer to such determination at step 602 is no, operation proceeds to step 604 wherein the system parameters for the current system are received. Then, from step 604, operation proceeds to step 605 wherein operation then proceeds back to step 504 of FIG. 5.

However, if at step 602 it is determined $SID_R$ is equal to $SID_S$ operation proceeds to step 606 wherein the subscribing unit receives an access type parameter message from the base station. Such access type parameter messages include local control messages, access type parameter messages, new access channel set messages, registration increment messages, location area messages, random challenge A messages, random challenge B messages, registration ID messages, a rescan message, and any other message required to provide such protocol and standard operation.

From step 606 operation proceeds to step 608 wherein the subscribing unit updates its busy idle status bit ($BIS_S$) which is set to the value of the busy idle status field of the received message. Also updated are the $PCI\_HOME_S$ register value and the $PCI\_ROAM_S$ register values 414 and 416, respectively. Operation then proceeds to step 610 where it is determined whether the subscribing unit is roaming. If the subscribing unit is not roaming, operation proceeds to step 612 where it is determined whether the register contents $PCI\_HOME_S$ is equal to one. If the $PCI\_HOME_S$ register is not equal to one operation proceeds to off page connector 614. However, if the $PCI\_HOME_S$ register contents is equal to one, operation proceeds to step 618.

If at step 610 it is determined that the subscribing unit is roaming, operation proceeds to step 616. If at step 616 register contents $PCI\_ROAM_S$ equal to zero then operation proceeds to off page connector 614. However, if at step 616 it is determined that the register contents $PCI\_ROAM_S$ is not equal to zero, operation proceeds to step 618.

At step 618 it is determined whether the $PCID_S$ is equal to one. If the $PCID_S$ is equal to one operation proceeds to off page connector 614. However, if register contents $PCID_S$ is not equal to one, then operation proceeds to step 620 wherein the register $PCID_S$ is set one. From step 620, operation proceeds to step 622 wherein the mobile accesses the system with the PCI registration indication. Such steps associated with step 622 will be discussed in more detail with reference to FIG. 6C. From step 622 operation proceeds to step 624 wherein operation proceeds again to step 504 of FIG. 5.

Referring now to FIG. 6B, from off page connector 614, operation proceeds to step 630 wherein the receiving system identifier $SID_R$ is updated. From step 630, operation proceeds to step 632 where it is determined whether $SID_R$ is equal to $SID_S$. If such is not the case at step 632, operation proceeds to step 634 wherein the operation proceeds again to step 504 of FIG. 5. However, if at step 632 it is determined that $SID_R$ is equal to $SID_S$, then operation proceeds to step 636 wherein the numeric values associated with the system are updated in the subscribing unit. Thus, effectively, at such point, parameters identifying the most recent system within which the subscribing unit has established operation become current.

Next, at step 638, it is determined whether autonomous registration is required. If autonomous registration is not required, operation proceeds to step 640 wherein the subscribing unit responds to the overhead information via communication with the base station. Then, from step 640, operation proceeds at step 641 back to step 614 wherein the subscribing unit continues its response to the overhead information. If at step 638, autonomous registration is not required, operation proceeds to step 642 wherein the subscribing unit accesses the base station with a system registration indication. From step 642 operation then proceeds again to step 504 of FIG. 5 at step 643.

FIG. 6C illustrates in more detail operation accomplished in step 622 of FIG. 6A. First, at step 650, the subscribing unit sends word A to the base station. Word A, as illustrated in Table 1 below, includes an order qualifier for the subscribing unit as well as mobile identification number subpart one. From step 650 operation proceeds to step 652 where it is determined whether the response is a PCI registration. If the response is not a PCI registration at step 652, the subscribing unit performs the action required which is not a PCI registration action at step 654. From step 654 operation proceeds again to step 504 of FIG. 5.

However, if the activity is a PCI registration at step 652 operation proceeds to step 658 wherein the subscribing unit sends word B to the base station. Word B, as illustrated in Table 2 below includes mobile identification number (MIN) subpart two as well as other information. Then, at step 660 it is determined whether authentication is required of the subscribing unit. If authentication is not required, operation proceeds to step 662 where it is determined whether the serial number is requested by the base station. If the serial number is not requested by the base station operation at step 662, operation proceeds to step 664 wherein word C, which would otherwise include the serial number, is not sent by the subscribing unit. However, if the serial number is required to be sent at step 662, the subscribing unit sends such serial number as word C at step 666. From both step 664 and step 666 operation proceeds to step 676.

TABLE 1

Word A - Abbreviated Address Word

| Information Element | Length (bits) |
|---|---|
| F | 1 |
| NAWC | 3 |
| T | 1 |
| S | 1 |
| E | 1 |
| ER = 0 | 1 |
| SCM (3-0) | 4 |
| MIN1 | 24 |
| P | 12 |

TABLE 2

Word B - Extended Address Word

| Information Element | Length (bits) |
|---|---|
| F = 0 | 1 |

TABLE 2-continued

Word B - Extended Address Word

| Information Element | Length (bits) |
|---|---|
| NAWC | 3 |
| LOCAL/MSG_TYPE = TBD | 5 |
| ORDQ = TBD | 3 |
| ORDER = TBD | 5 |
| LT | 1 |
| EP | 1 |
| SCM(4) | 1 |
| MPCI | 2 |
| SDCC1 | 2 |
| SDCC2 | 2 |
| $MIN2_{33-24}$ | 10 |
| P | 12 |

If authentication is required at step 660, operation proceeds to step 670 where it is determined whether or not the serial number is required. If the serial number is not required, then the authentication which may include protocol information is sent at step 672. However, if the serial number is required at step 670 the subscribing unit sends the serial number and authentication at step 674. From both step 672 and step 674 operation proceeds to step 676.

At step 676 it is determined whether the access is a PCI registration by determining whether $PCID_S=1$. If the access is not a PCI registration operation, proceeds to step 678 wherein the required action is performed. If the access is a PCI registration request at step 676, operation proceeds to step 680 wherein registration confirmation is awaited by the subscribing unit. Upon receipt of such registration confirmation operation proceeds to step 678 as it does from step 676. At step 678, operation proceeds again to step 504 of FIG. 5.

Figure 7:
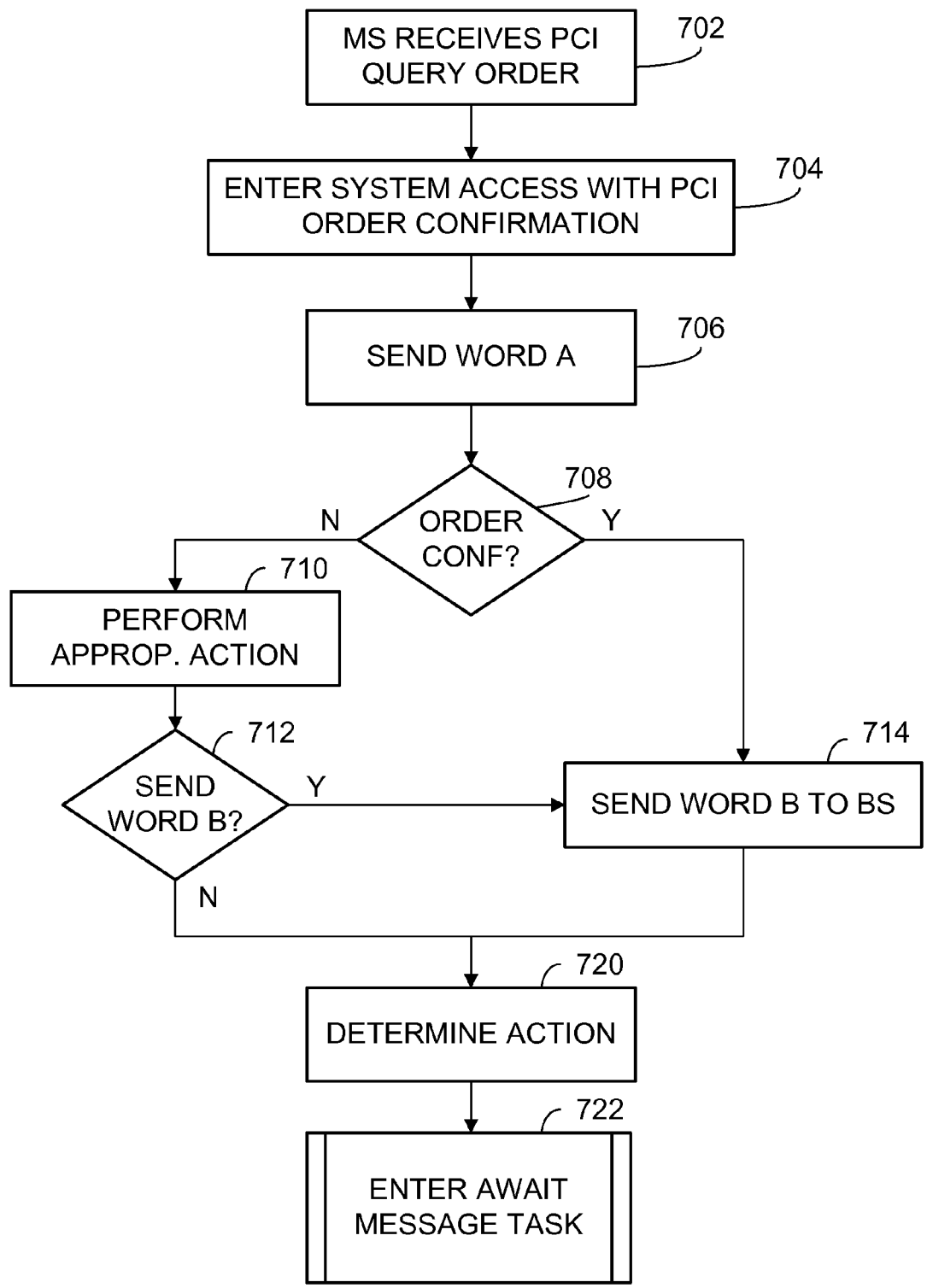
FIG. 7 is a logic diagram illustrating operation of a wireless communication system constructed according to the present invention in responding to a received PCI query order.

FIG. 7 illustrates operation according to the present invention in more detail than those steps described at blocks 516 and 518 of FIG. 5. At step 702, the subscribing unit receives a PCI query order. Upon such receipt of the PCI query order, operation proceeds to step 704 wherein the subscribing unit enters a system access with a PCI order confirmation. Then, the subscribing unit sends word A at step 706.

From step 706 operation proceeds to step 708 where it is determined whether the access is an order confirmation. If the access is not an order confirmation, operation proceeds to step 710 wherein the required action is performed and then to step 712. At step 712, it is determined whether word B is to be sent. If so, operation proceeds to step 714 where word B is sent to the base station. Also, if at step 708 it is determined that the access is not an order confirmation, operation also proceeds to step 714 wherein word B is sent. From step 714, operation proceeds to step 720. At step 720 the action to be taken is determined. After such determination at step 720, the subscribing unit enters an await message task at step 722 wherein the subscribing unit waits further instructions from the base station.

Figure 8:
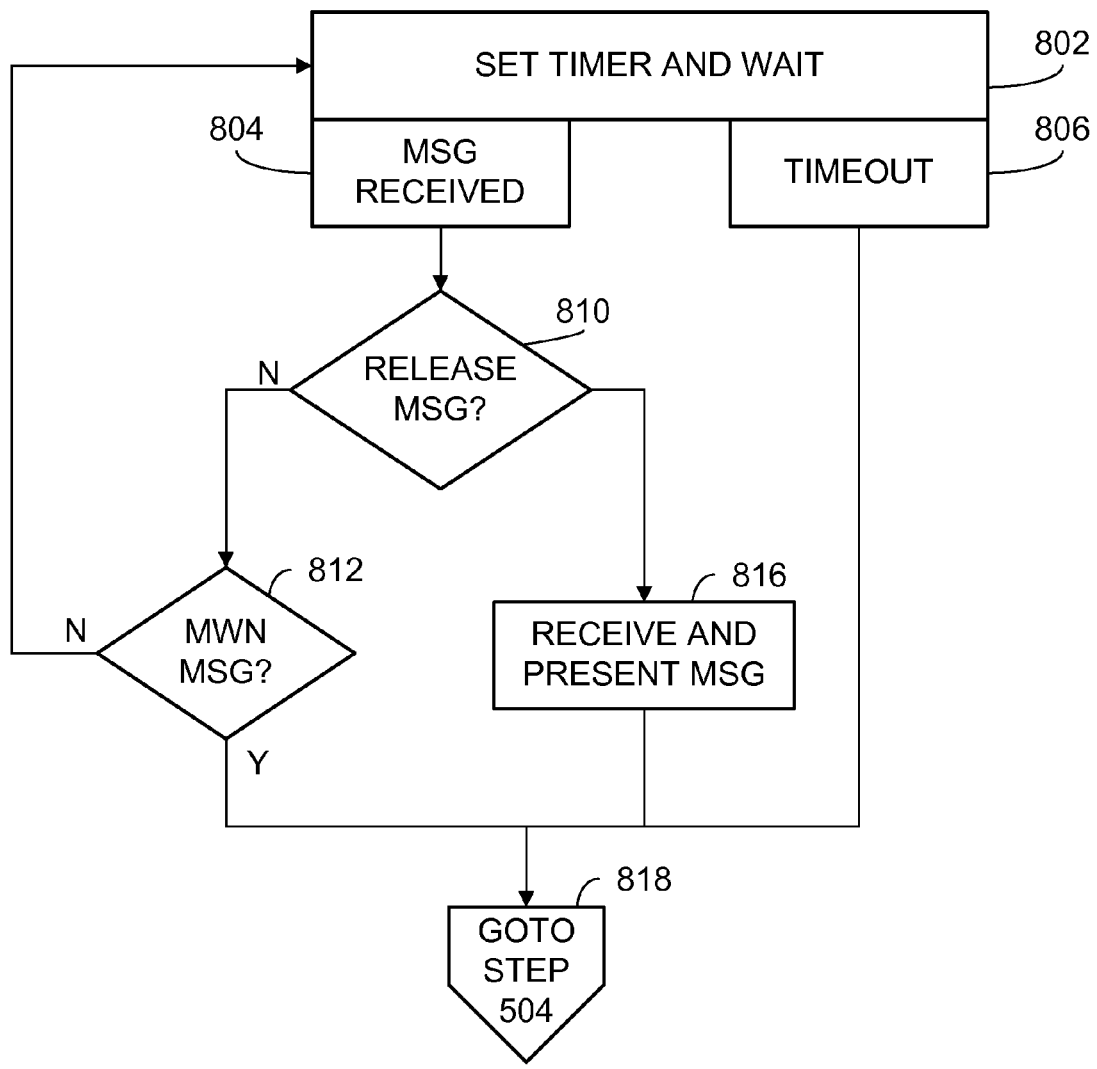
FIG. 8 is a logic diagram illustrating operation of a wireless communication system constructed according to the present invention in executing the await message task.

FIG. 8 illustrates operation upon entering the await message task described with respect to FIG. 7. Upon entering the await message task at step 802, a timer is set and the subscribing unit waits. Upon the receipt of a message at step 804 the subscribing unit determines whether the message is a release message at step 810. If the message is a release message, operation proceeds to step 816 wherein the subscribing unit receives the message, presents the message and is released. Operation then proceeds from step 816 where operation proceeds again to step 504 of FIG. 5. However, if at step 810, it is determined that the message is not a release message, operation proceeds to step 812 wherein it is determined that the message is a message waiting notification. If the message is not a message wait notification, operation proceeds to step 802 without a timer reset. If at step 812 it is determined that the message is a message waiting notification, operation proceeds to step 818.

Upon a timeout at step 806, operation proceeds to step 818 and then to step 504 of FIG. 5. Such operation would occur when the subscribing unit receives no message from the base station during the expected time period. Such could be the case during heavy loading periods or if the subscribing unit has lost communication with the base station.

Figure 9:
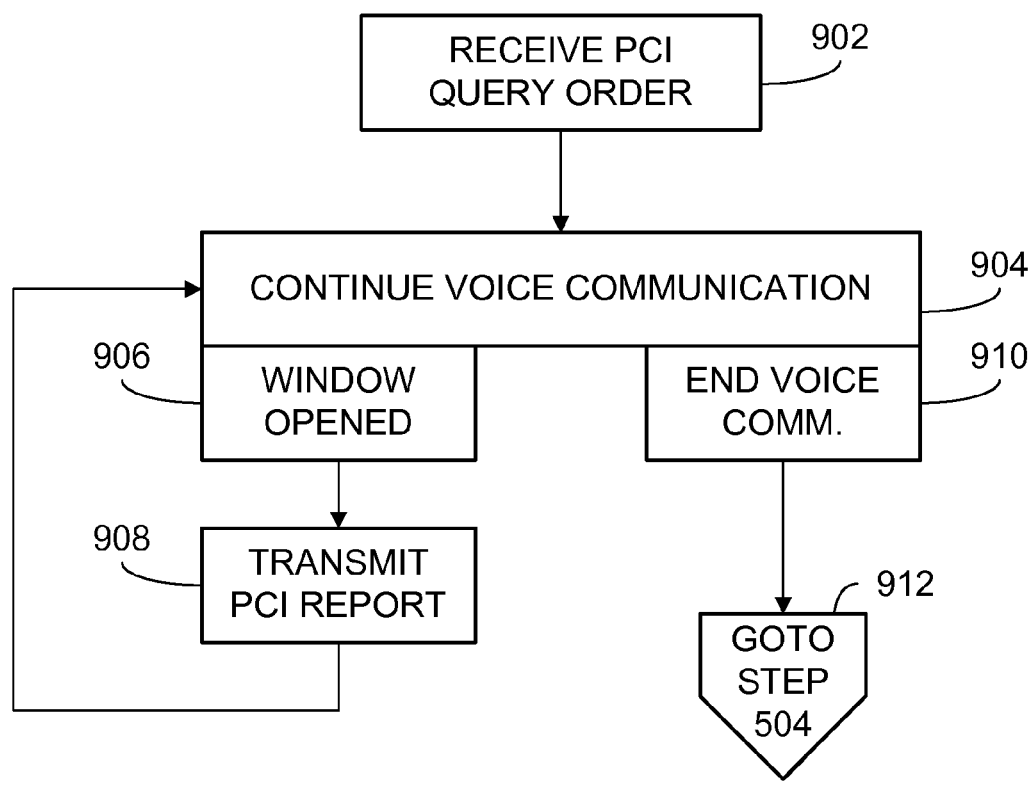
FIG. 9 is a logic diagram illustrating operation of a wireless communication system constructed according to the present invention in responding to a received PCI query order on a voice channel.

FIG. 9 illustrates operation according to step 518 of FIG. 5 but when the subscribing unit is in communication with the base station on a voice channel. In such case, the subscribing unit receives a PCI query order at step 902 over the voice channel. During ongoing communications, the base station interrupts for a small period of time any voice communication to initiate contact with the subscribing unit on the voice channel. During such contact, PCI query information is sent to the subscribing unit and the subscribing unit responds according to such query. However, during voice communication initiation operations wherein ongoing voice communication has not been established, such PCI query may be sent to the subscribing unit and the subscribing unit may respond to such PCI query without interrupting such ongoing voice communications.

From step 902, operation proceeds to step 904 wherein the subscribing unit and base station continue the voice communications. During continued voice communications, the subscribing unit may respond to the base station or may respond to the PCI query if it has not previously done so. In such case, the subscribing unit may wait for a window to open during which it may respond to the base station. When such window is opened at step 906, operation proceeds to step 908 wherein the subscribing unit provides a PCI report to the base station. From step 908 operation proceeds again to step 904 wherein the voice communication is continued.

From step 904, operation may proceed to step 910 wherein the voice communication is ended. Upon the end of such voice communication of step 910, operation proceeds to step 912 wherein operation returns to step 504 of FIG. 5. Thus, PCI registration based upon a query order may be accomplished over the voice channel when such channel is available during normal operations.

Appendices A, B and C illustrate the principles of the present invention incorporated into three separate protocol standards. However, the principles of the present invention could be implemented into additional protocol standards as well.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

The invention claimed is:

1. A method for operating a mobile station to receive extended services from a wireless communication system, the method comprising:

receiving a broadcast transmission from a base station of the wireless communication system, the broadcast transmission including at least one parameter intended to preclude the mobile station from unilaterally reporting its protocol capabilities to the base station;

receiving a query from the base station on an analog channel to report protocol capabilities supported by the mobile station;

transmitting a protocol capability report to the base station that indicates at least one extended service and at least one extended services delivery option supported by the mobile station; and receiving the at least one extended service from the base station corresponding to the at least one extended services delivery option supported by the mobile station.

2. The method of claim 1, wherein the broadcast transmission includes parameters intended to preclude non-roaming mobile stations from unilaterally reporting their protocol capabilities to the base station.

3. The method of claim 1, wherein the broadcast transmission includes parameters intended to preclude roaming mobile stations from unilaterally reporting their protocol capabilities to the base station.

4. The method of claim 1, wherein the broadcast transmission includes:

first parameters intended to direct non-roaming mobile stations whether to unilaterally report their protocol capabilities to the base station; and second parameters intended to direct roaming mobile stations whether to unilaterally report their protocol capabilities to the base station.

5. The method of claim 1:

wherein the mobile station receives the query via an analog control channel; and further comprising camping, for a period of time, on the analog control channel to await delivery of the at least one extended service after reporting its protocol capabilities to the base station.

6. The method of claim 5, wherein the period of time is comparable to a period of time the mobile station would camp on the analog control channel after responding to a page from the base station.

7. The method of claim 1:

wherein the mobile station receives the query via a traffic channel while servicing an ongoing call; and wherein the ongoing call is temporarily interrupted to receive the query and to transmit the protocol capability report.

8. The method of claim 7, further comprising the call being handed over from a previously serving wireless communication system to the wireless communication system.

9. A mobile station comprising:

means for receiving a broadcast transmission from a base station of a wireless communication system, the broadcast transmission including at least one parameter intended to preclude the mobile station from unilaterally reporting its protocol capabilities to the base station;

means for receiving a query from the base station on an analog channel to report protocol capabilities supported by the mobile station;

means for transmitting a protocol capability report to the base station that indicates at least one extended service and at least one extended services delivery option supported by the mobile station; and means for receiving the at least one extended service from the base station corresponding to the at least one extended services delivery option supported by the mobile station.

10. The mobile station of claim 9, wherein the broadcast transmission includes instructions intended to preclude non-roaming mobile stations from unilaterally reporting their protocol capabilities to the base station.

11. The mobile station of claim 9, wherein the broadcast transmission includes instructions intended to preclude roaming mobile stations from unilaterally reporting their protocol capabilities to the base station.

12. The mobile station of claim 9, wherein the broadcast transmission includes:

first parameters intended to direct non-roaming mobile stations whether to unilaterally report their protocol capabilities to the base station; and second parameters intended to direct roaming mobile stations whether to unilaterally report their protocol capabilities to the base station.

13. The mobile station of claim 9, further comprising:

means for receiving the query via an analog control channel; and means for camping, for a period of time, on the analog control channel to await delivery of the at least one extended service after reporting its protocol capabilities to the base station.

14. The mobile station of claim 13, wherein the period of time is comparable to a period of time the mobile station would camp on the analog control channel after responding to a page from the base station.

15. The mobile station of claim 9, further comprising:

means for receiving the query via a traffic channel while servicing an ongoing call; and means for temporarily interrupting the ongoing call to receive the query and to transmit the protocol capability report.

* * * * *

UNITED STATES PATENT AND TRADEMARK OFFICE
CERTIFICATE OF CORRECTION

| | | |
|---|---|---|
| PATENT NO. | : 7,805,139 B2 | Page 1 of 1 |
| APPLICATION NO. | : 12/501450 | |
| DATED | : September 28, 2010 | |
| INVENTOR(S) | : Shaheen et al. | |

It is certified that error appears in the above-identified patent and that said Letters Patent is hereby corrected as shown below:

In Column 15, Line 27, in Claim 5, delete "claim 1:" and insert -- claim 1, --, therefor.

In Column 15, Line 38, in Claim 7, delete "claim 1:" and insert -- claim 1, --, therefor.

Signed and Sealed this
First Day of February, 2011

David J. Kappos
*Director of the United States Patent and Trademark Office*